(12) United States Patent
Suzuki

(10) Patent No.: US 12,730,988 B2
(45) Date of Patent: Sep. 8, 2026

(54) READER THAT READS INFORMATION FROM RF TAG

(71) Applicant: ASTERISK, INC., Osaka (JP)

(72) Inventor: Noriyuki Suzuki, Osaka (JP)

(73) Assignee: ASTERISK, INC., Osaka (JP)

( * ) Notice: Subject to any disclaimer, the term of this patent is extended or adjusted under 35 U.S.C. 154(b) by 0 days.

(21) Appl. No.: 18/661,080

(22) Filed: May 10, 2024

(65) Prior Publication Data

US 2025/0028914 A1 Jan. 23, 2025

Related U.S. Application Data

(63) Continuation of application No. 17/291,370, filed as application No. PCT/JP2018/043860 on Nov. 28, 2018, now Pat. No. 12,014,239.

(30) Foreign Application Priority Data

Nov. 6, 2018 (JP) ................................. 2018209301

(51) Int. Cl.
*G06K 7/10* (2006.01)

(52) U.S. Cl.
CPC ..... *G06K 7/10079* (2013.01); *G06K 7/10297* (2013.01); *G06K 7/10316* (2013.01)

(58) Field of Classification Search
None
See application file for complete search history.

(56) References Cited

U.S. PATENT DOCUMENTS

2006/0255951 A1* 11/2006 Roeder ................ G06K 7/0008 340/572.1
2017/0235878 A1 8/2017 Debusk et al.
2018/0096292 A1* 4/2018 DeBusk ................. G16H 10/60

* cited by examiner

*Primary Examiner* — John F Mortell
(74) *Attorney, Agent, or Firm* — Spencer Fane LLP

(57) ABSTRACT

A reader that reduces the impacts of radio waves while keeping the convenience during reading, and such an information providing system. The reader reads information from a RF tag attached to a product. The reader has an opening, and includes a shield that accommodates the product placed through the opening, and an antenna that radiates radio waves for communicating with the RF tag attached to the accommodated product. The reader reads information from the RF tag while keeping the shield open.

8 Claims, 7 Drawing Sheets

PRODUCTS
PRICE

T-SHIRT
POLO SHIRT
PANTS
SOCKS
TOTAL ¥4,040
72
22
S
B
12
P
20
36
28
32
10

10
IC CHIP
18
12
ANTENNA
14

16
ANTENNA
60
COMMUNICATION CIRCUIT
62
48
56
C P U
MEMORY
58

WIFI MODULE
64
22
WIFI MODULE
70
72
66
68
LCD DISPLAY
C P U
MEMORY
76
INFORMATION PROVIDING PROGRAM
PRODUCT TABLE
TOUCH SENSOR
74
78

COMMUNICATION AREA
16
20
24
26
28
30
32
34
36
38
40
42
44
46
48
50
52
54
60

FIG. 6C
92
92
50
60
38
FIG. 6B
40
38a
60c
28
94
96
50
60a
38a
28
40
38a
60b
FIG. 6A
28
40
38
50
60
38
28

READER THAT READS INFORMATION FROM RF TAG

CROSS-REFERENCE TO RELATED APPLICATIONS

This application is a continuation of U.S. application Ser. No. 17/291,370, filed May 5, 2021, which is a U.S. National Stage application of International Application No. PCT/JP2018/043860, filed Nov. 28, 2018, which claims priority to Japanese Patent Application No. 2018-209301, filed Nov. 6, 2018, the contents of each of which are hereby incorporated herein by reference.

BACKGROUND

Field of the Invention

The present invention relates to a reader that reads information from a RF tag.

Background Information

FIG. 7 shows a checkout system 100, which has been proposed in recent years for a smooth checkout at stores. This checkout system 100 is made up of: a RF tag 102 attached to each product P; a reader/writer 104 that reads information from the RF tag 102; and a register 106 that is communicatively connected to the reader/writer 104. The reader/writer 104 is installed on the back face of the checkout counter T. The reader/writer 104 reads information collectively from the RF tags 102 of the products P in the shopping basket on the checkout counter T, and transmits the read information to the register 106. The register 106 then performs checkout processing based on the product information (product names and prices) corresponding to the received information.

This checkout system 100 enables checking out through a simple operation of placing a shopping basket on the checkout counter T. The system enables checking out of the shopping basket that is placed on the checkout counter T, and this allows customers to visually check the contents in the basket and reconfirm the products P to be purchased even during the checkout process. This system has a communication area of the reader/writer 104 that is continuous to the space where the customer exists, and this configuration therefore causes the radio waves emitted from the antenna of the reader/writer 104 to affect other devices or the radio waves emitted from other devices to interfere with the communication radio waves of the reader/writer 104.

To avoid this, the reader of JP 2015-207110 A includes a housing for accommodating products put through an opening and a lid for opening and closing the opening, and the housing and the lid are formed of a material that reflects or absorbs radio waves. This reader prevents the above-mentioned problems about radio waves, because it reads RF tags when the opening of the housing is closed with the lid, i.e., when the articles stored in the housing are sealed with the shield.

SUMMARY

It has been determined that the reader of JP 2015-207110 A, however, requires a troublesome operation such as placing products in the housing and closing the lid for checkout, and then opening the lid and taking out the products. Customers are not allowed to visually check the contents of the shopping basket accommodated in the housing, so that they fail to reconfirm the products during the checkout process. That is, the convenience of the customers is impaired.

In this way, it has been difficult to balance between ensuring customer's convenience and reducing the impact of radio waves. Such problems can occur not only with readers used for checkout process, but also with stationary devices that read RF tags attached to articles.

In view of the above-described problems, embodiments of the present invention provide a solution to conventional systems by providing a reader that reduces the impacts of radio waves while keeping the convenience during reading.

To achieve the above, an embodiment of the present invention relates to a reader that reads information from a RF tag attached to an article. The reader includes: an antenna that radiates radio waves to communicate with the RF tag; and a shield that accommodates the antenna and has an opening larger than the article. The reader reads information from the RF tag while keeping the shield open.

The shield includes: a radio wave absorption layer that absorbs the radio waves; and a radio wave reflection layer disposed on an outside of the radio wave absorption layer, the radio wave reflection layer reflecting the radio waves. Of the radio wave absorption layer and the radio wave reflection layer, which extend from the opening toward the antenna, the radio wave reflection layer extends longer than the radio wave absorption layer does.

As discussed herein, embodiments of the present invention have advantageous over the conventional systems. According to one embodiment of the present invention, the antenna is housed in the shield. This structure suppresses the spread of radio waves emitted from the antenna and thus reduces the impact of radio waves on other devices. The shield has an opening larger than an article, so that a user can place an article in the shield or place an article above the opening for reading of the RF tag. Reading is performed while keeping the shield open, and this does not require troublesome operations such as closing the opening as in the conventional one. This embodiment of the present invention therefore reduces the impacts of radio waves while keeping the convenience during reading.

BRIEF DESCRIPTION OF DRAWINGS

The invention will be explained in more detail hereinafter with reference to the drawings.

FIG. 1A is a perspective view of a reader, and FIG. 1B shows a mode of providing information with a mobile terminal.

FIG. 6A is a cross-sectional view of a reader according to another modified example, FIG. 6B is a cross-sectional view of a reader according to another modified example, FIG. 6C is a cross-sectional view of a reader according to another modified example.

DETAILED DESCRIPTION

Figures 1A, 1B:
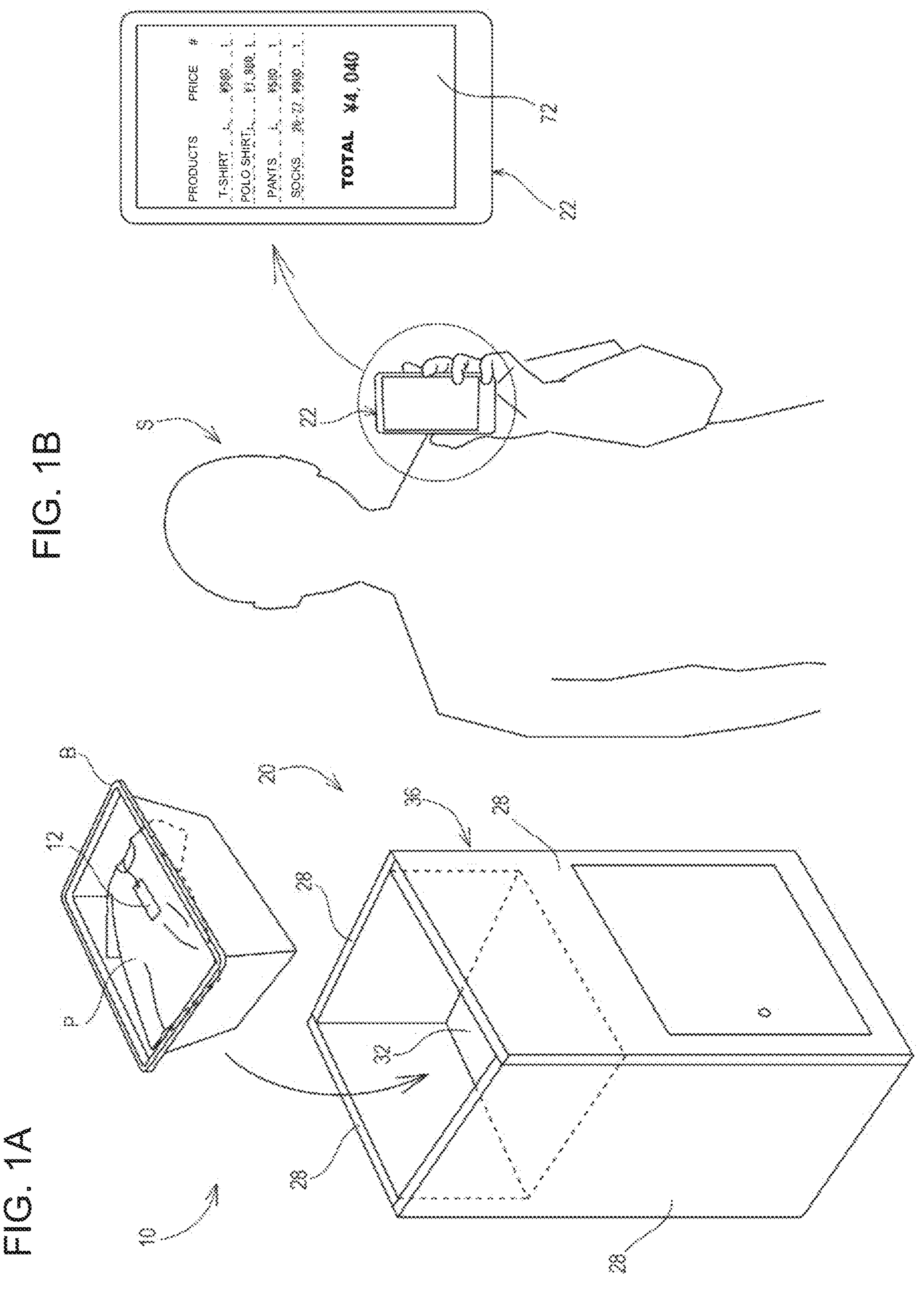
FIGS. 1A and 1B show an information providing system according to one embodiment of the present invention, where

Referring to the drawings, the following describes some embodiments of a reader and an information providing system according to the present invention.

Figures 2A, 2B, 2C:
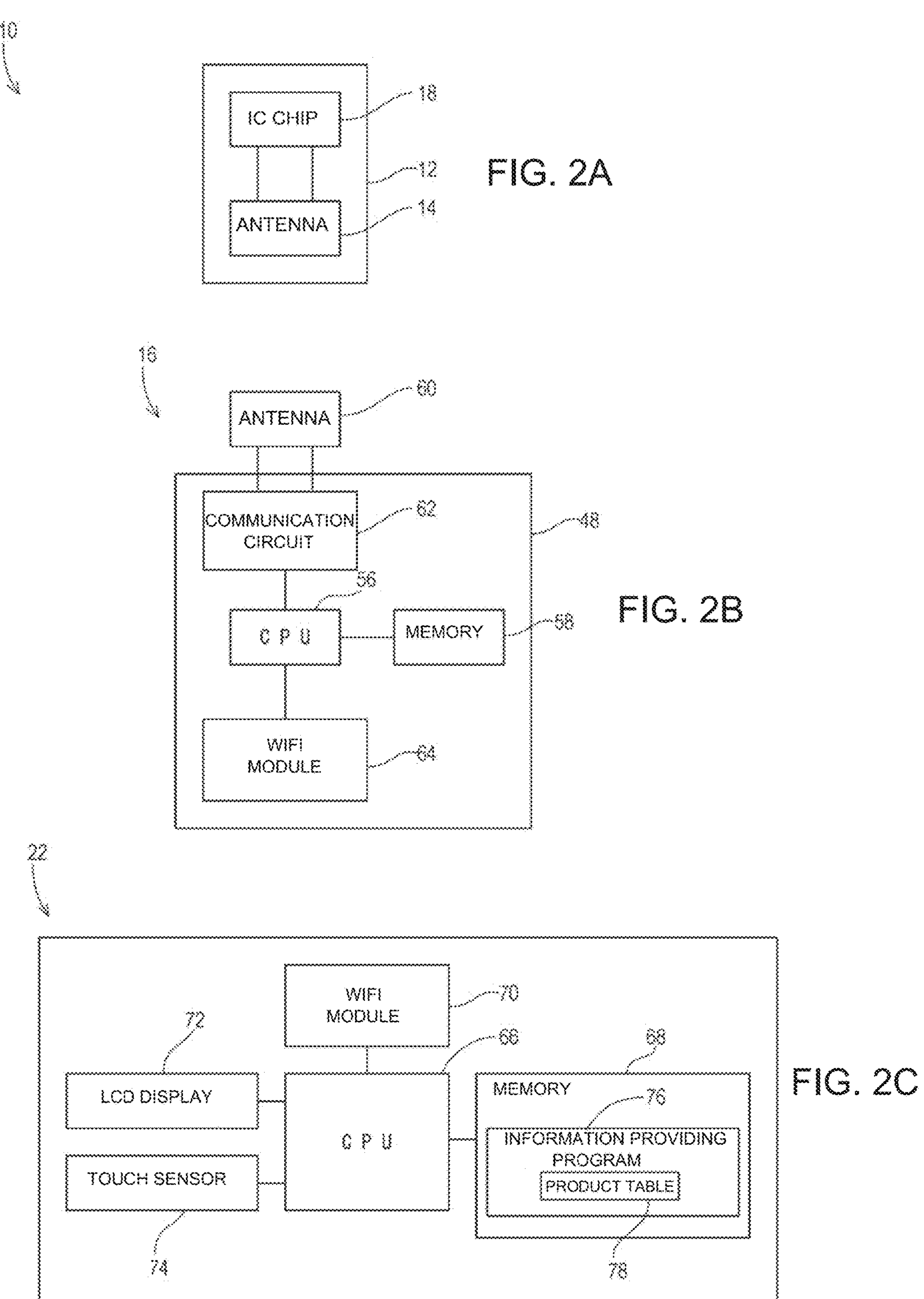
FIGS. 2A-2C illustrate block diagrams of a RF tag, a reader, and a mobile terminal that make up the information providing system.

As shown in FIG. 1A, the information providing system 10 according to an embodiment of the present embodiment is used in a store that sells a product P such as clothing. At the store, a RF tag 12 is attached to each product P together with a price tag. As shown in FIGS. 2A-2C, the RF tag 12 includes an antenna 14 and an IC chip 18 having a built-in communication circuit (not shown) that communicates with a reader/writer 16 via the antenna 14. The IC chip 18 has a built-in CPU (not shown) and memory (not shown), and the memory stores unique information (hereinafter referred to as "tag information") defined so as to uniquely identify the RF tag 12.

Referring back to FIGS. 1A and 1B, products P each to which the RF tag 12 is attached are displayed on the shelves and tables in the store so that customers select the products P they like and put them in their shopping baskets B. There are needs to understand the total price of a plurality of products P in the shopping basket B during the shopping. To meet the needs, the information providing system 10 according to the an embodiment of present embodiment uses a reader 20 that reads the tag information of the RF tags 12 to display the total price of the products P in the shopping basket B with a mobile terminal 22 of a clerk S.

The following describes the reader 20 and the mobile terminal 22 in detail.

Figures 3A, 3B, 3C:
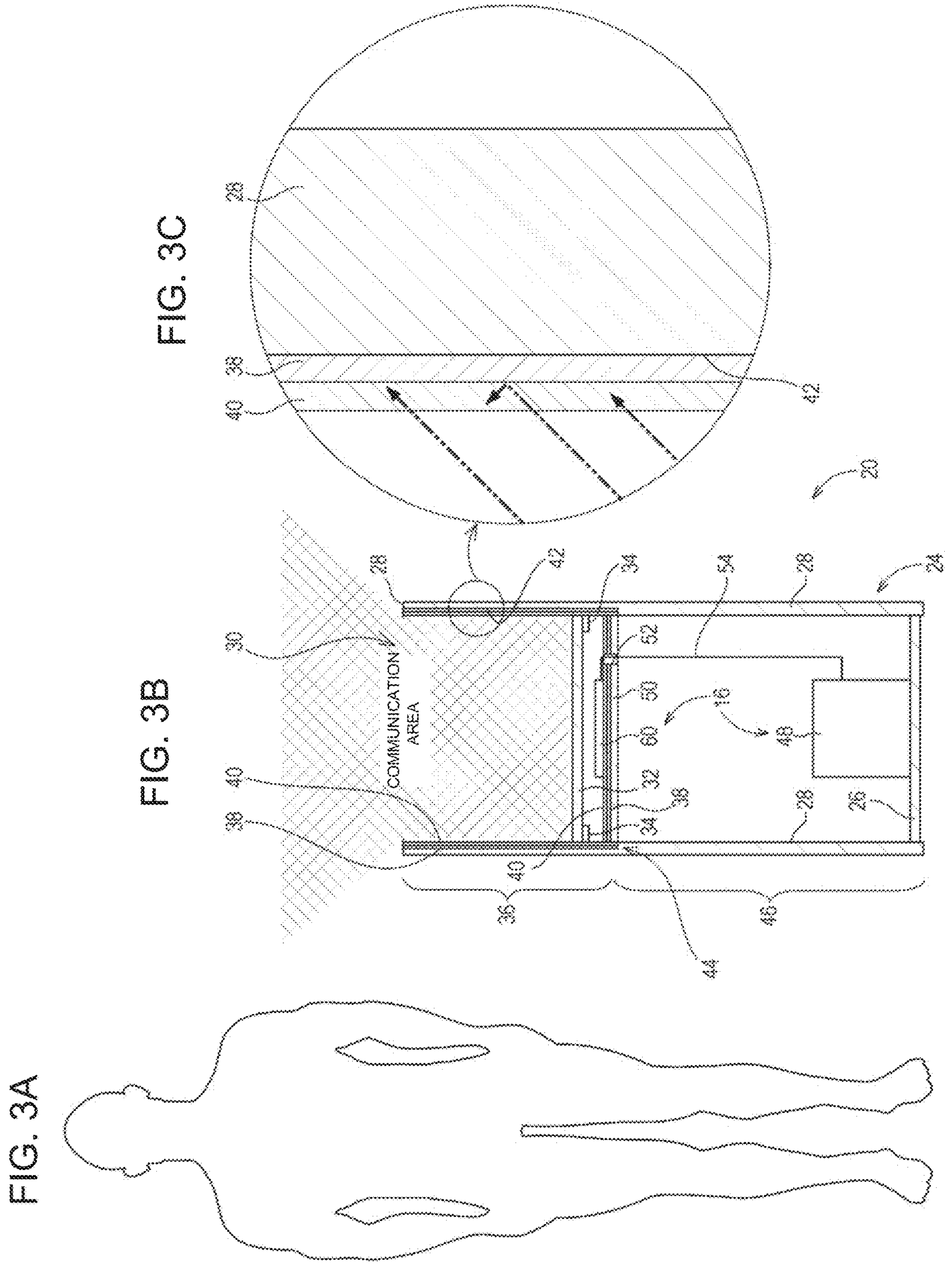
FIG. 3A shows a user.
FIG. 3B shows the reader in cross section and FIG. 3C shows a partially enlarged cross section of the reader.

The reader 20 is a stationary device that communicates with the RF tag 12 attached to each product P in the shopping basket B to read the tag information. The reader 20 includes a housing 24 as shown in FIGS. 3A-3C. The housing 24 has a rectangular bottom plate 26 that is larger than the outer shape defined with the edges of the shopping basket B. Four wall plates 28 (FIGS. 1A and 1B) standing perpendicular to the bottom plate 26 are joined to the edges of the bottom plate 26. Each wall plate 28 extends vertically up to about the height of an adult's waist, and their vertical edges are mutually joined. These four wall plates 28 (FIGS. 1A and 1B) and bottom plate 26 define the rectangular housing 24 that opens upward.

Two horizontal plates 32 and 50 are disposed above and below inside the housing 24. The upper horizontal plate 32 is detachably supported with shelf supports 34. This horizontal plate 32 is a rectangular plate, on which a shopping basket (FIGS. 1A and 1B) containing the products P (FIGS. 1A and 1B) is placed, and is located at a height adjusted so that the shopping basket B is housed within the enclosure defined with the wall plates 28. In other words, the horizontal plate 32 functions as a place, on which the shopping basket B is put. The lower horizontal plate 50 adheres to the inner wall surfaces of the wall plates 28. An antenna 60 of the reader/writer 16 is placed on the horizontal plate 50. These horizontal plates 32 and 50, wall plates 28, and bottom plate 26 are made of wood.

Each wall plate 28 has an inner wall surface 42, and on a part of the inner wall surface 42 that is above the horizontal plate 50, a radio wave reflection sheet 38 is attached. The radio wave reflection sheet 38 is made of metal such as aluminum, and functions as a radio wave reflection layer that reflects radio waves on its surface. A radio wave absorption sheet 40 is attached on the entire inner surface of the radio wave reflection sheet 38. The radio wave absorption sheet 40 is made of a mixture of magnetic metal powder with a rubber material, and functions as a radio wave absorption layer that absorbs radio waves inside the sheet. The radio wave reflection sheet 38 is attached also to the upper surface of the horizontal plate 50, and the radio wave absorption sheet 40 is attached to this radio wave reflection sheet 38. Thus, the radio wave reflection sheet 38 and the radio wave absorption sheet 40 on each wall plate 28 and the horizontal plate 50 make up a shield 44 that accommodates the antenna 60 and has an opening 30 facing upward.

These shield 44 and horizontal plate 32 define a space for accommodating the shopping basket B. In other words, the shield 44 and the horizontal plate 32 function as a container 36 for accommodating the shopping basket B.

The internal space below the horizontal plate 50 is the space where a main body 48 of the reader/writer 16 is installed, and the lower parts of the four wall plates 28 and the bottom plate 26, which define this space, function as a base 46. The horizontal plate 50, and the radio wave reflection sheet 38 and the radio wave absorption sheet 40 attached to the horizontal plate 50 have a through hole 52 penetrating these plate and sheets. The antenna 60 and the main body 48 installed on the bottom plate 26 are electrically connected via wiring 54 passing through this through hole 52.

As shown in FIGS. 2A-2C, the main body 48 of the reader/writer 16 includes: a CPU 56; a memory 58; a communication circuit 62 (transmission/reception circuit, oscillation circuit, modulation/demodulation circuit) for communicating with the RF tags 12 via the antenna 60; and a wifi module 64. The CPU 56 executes a program in the memory 58 to collectively or individually acquire the tag information from the RF tags 12 via the communication circuit 62 and the antenna 60, and transmit the tag information to the mobile terminal 22 with the wifi module 64.

The mobile terminal 22 is a smart device such as a tablet terminal or a smartphone owned by a clerk S (FIG. 1B) at the store. As shown in FIGS. 2A-2C, the mobile terminal 22 is implemented with a computer mainly including a CPU 66, a memory 68, a wifi module 70, a liquid crystal display 72, and a touch sensor 74.

Figure 4:
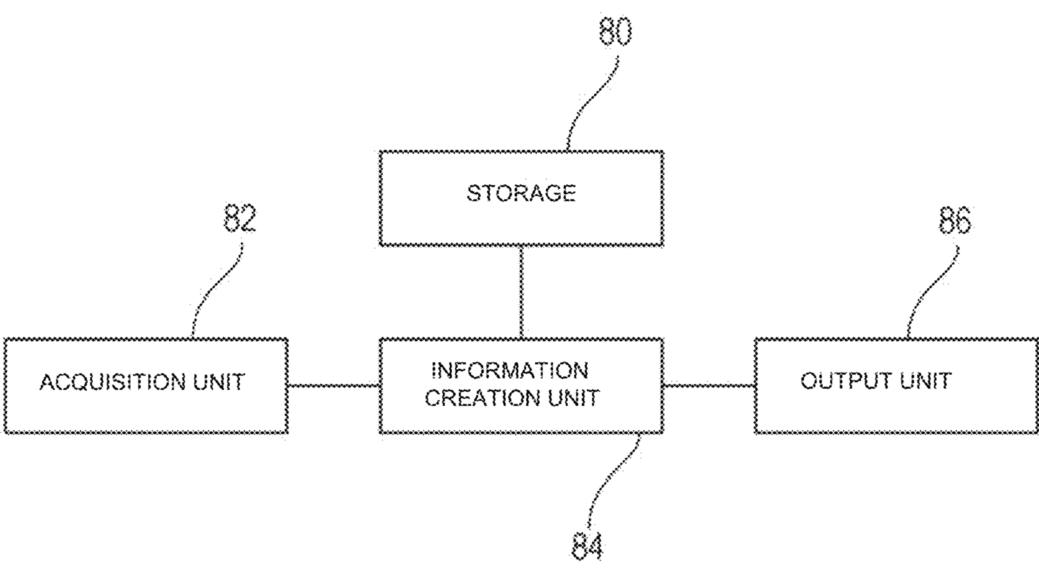
FIG. 4 is a functional block diagram of the mobile terminal.

The memory 68 stores an information providing program 76. The information providing program 76 defines a product table 78 in advance. The product table 78 associates product information such as the name, size, and price of each product P (FIGS. 1A and 1B) for all of the products P in the store with corresponding tag information. This means that the computer having the memory 68 functions as a storage 80 (FIG. 4) that stores the product information in association with the tag information.

The information providing program 76 further defines the processing to provide information about the products P to customers, and the CPU 66 executes this processing. Specifically, the CPU 66 executes an acquisition step, an information creation step, and an output step in this order.

The acquisition step acquires tag information, and the step includes connection to a network via the wifi module 70, identification of a reader/writer 16 existing on the connected network with the IP address, requesting the transmission of tag information from the identified reader/writer 16, and receiving the read tag information from the reader/writer 16. In this way, the wifi module 70 and the CPU 66 function as an acquisition unit 82 (FIG. 4) that acquires tag information.

The information creation step creates information to be provided to customers based on the received tag information, and the step includes extraction of the product information corresponding to the received tag information from the product table 78, and listing the extracted product information or adding up the prices included in the product information. In this way, the CPU 66 functions as an information creation unit 84 (FIG. 4) that creates information to be provided.

The output step outputs the created information, and this step displays a list of the products P in the shopping basket B and their total price on the liquid crystal display 72 as shown in FIG. 1B. In this way, the CPU 66 and the liquid crystal display 72 function as an output unit 86 (FIG. 4) that outputs information to be provided.

As described above, an embodiment of the present embodiment is configured so that, as shown in FIGS. 1A and 1B, when the shopping basket B is set in the container 36 of the reader 20, the reader 20 reads tag information of each product P while keeping the container 36 open, and the mobile terminal 22 displays information to be provided (including the list and the total price).

The reader 20 of the present embodiment described above completes the preparation for reading the RF tag 12 with a simple operation such as putting the shopping basket B into the container 36 through the opening 30. At the time of reading (communication), the customer is allowed to reconfirm the products P by seeing the products P in the shopping basket B through the opening 30.

The shield 44 making up the container 36 suppresses the spread of radio waves emitted from the antenna 60 of the reader/writer 16 to the surrounding of the reader 20, and thus reduces the impacts of the radio waves on other devices. This also suppresses entering of the radio waves from other devices surrounding the reader 20 into the container 36, thereby reducing degradation of reading accuracy caused by the interference of the radio waves.

As shown in FIGS. 3A-3C, the shield 44 includes the radio reflection sheet 38 located outside and surrounding the radio wave absorption sheet 40. This leads to excellent shielding performance for radio waves with the shield 44, because weak radio waves leaked from the radio wave absorption sheet 40 is reflected by the radio wave reflection sheet 38, and is absorbed inside the radio wave absorption sheet 40. As a result, the communication area with the RF tags 12 is limited to the container 36 and the area above the container 36, and this does not cause a failure such as erroneous reading of the tag information on the RF tag 12 for a product P located around the reader 20.

That is a description of the reader and the information providing system according to the present invention by way of the embodiment. The present invention is not limited to the above-stated embodiment, and can include the following embodiments, for example.

Modified Examples

In the above embodiment, the antenna 60 of the reader/writer 16 is attached to the horizontal plate 50. The antenna 60 can be attached to the lower face of the horizontal plate 32. In this embodiment, the horizontal plate 50 can be omitted to simplify the structure. The antenna 60 can be attached to the upper face of the horizontal plate 32. In this embodiment, a radio wave reflection sheet 38 can be disposed on the upper face or the lower face of the horizontal plate 32 to further reduce the impacts of radio waves. In another example, the antenna 60 can be attached to the inner wall face of any wall plate 28. That is, the antenna 60 can be attached to any plate inside the shield 44 as long as it is located away from the opening 30.

In the above embodiment, the radio wave reflection sheet 38 and the radio wave absorption sheet 40 on the inner wall face of each wall plate 28 can extend downwardly to the extent that the wireless communication between the main body 48 of the reader/writer 16 and the mobile terminal 22 is not inhibited.

In one embodiment, the radio wave absorption sheet 40 on the horizontal plate 50 cam be omitted.

The radio wave reflection layer and the radio wave absorption layer are not limited to the sheet member, and can be formed of a plate member. In this embodiment, the upper part of each wall plate 28 making up the peripheral wall around the shield 44 can be omitted.

In the above embodiment, the horizontal plate 32 is disposed at a position (depth) such that the shopping basket B is accommodated. The horizontal plate 32 can be disposed at a position (depth) such that a portion of the shopping basket B is exposed.

Figure 5:
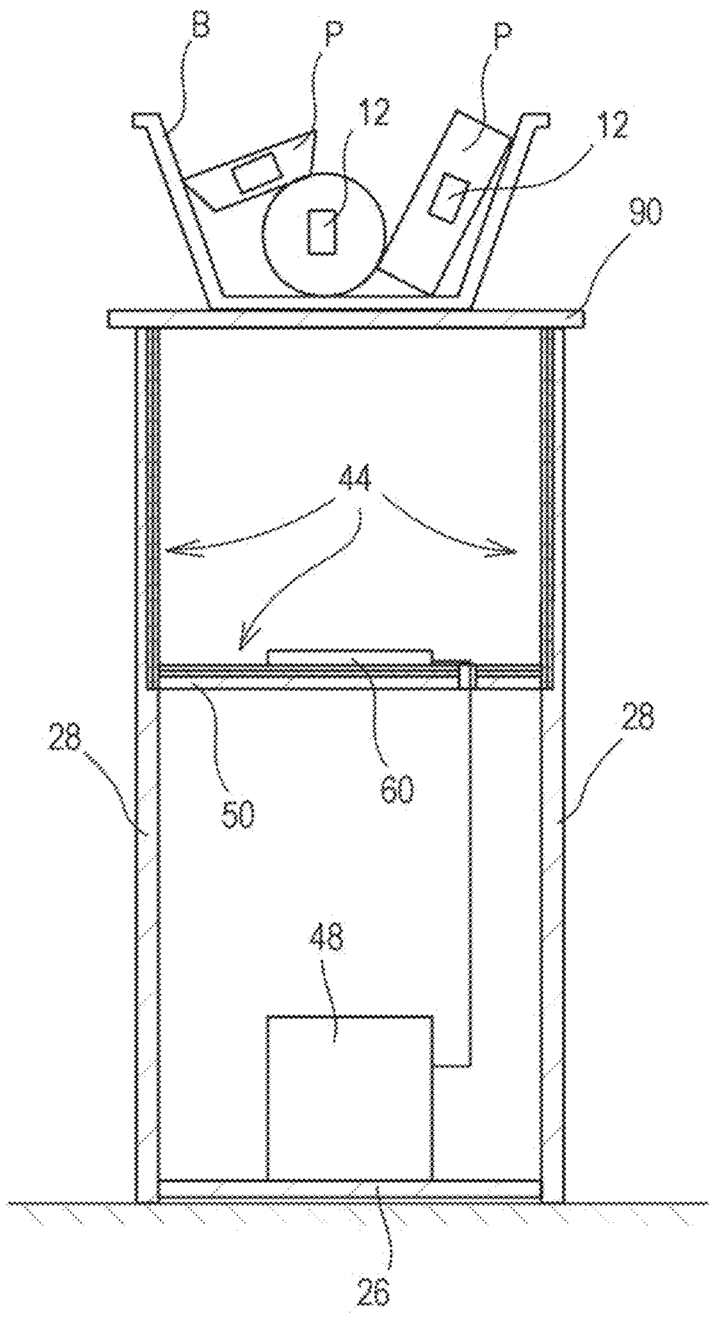
FIG. 5 is a cross-sectional view of a reader according to a modified example of the embodiment.
Figure 7:
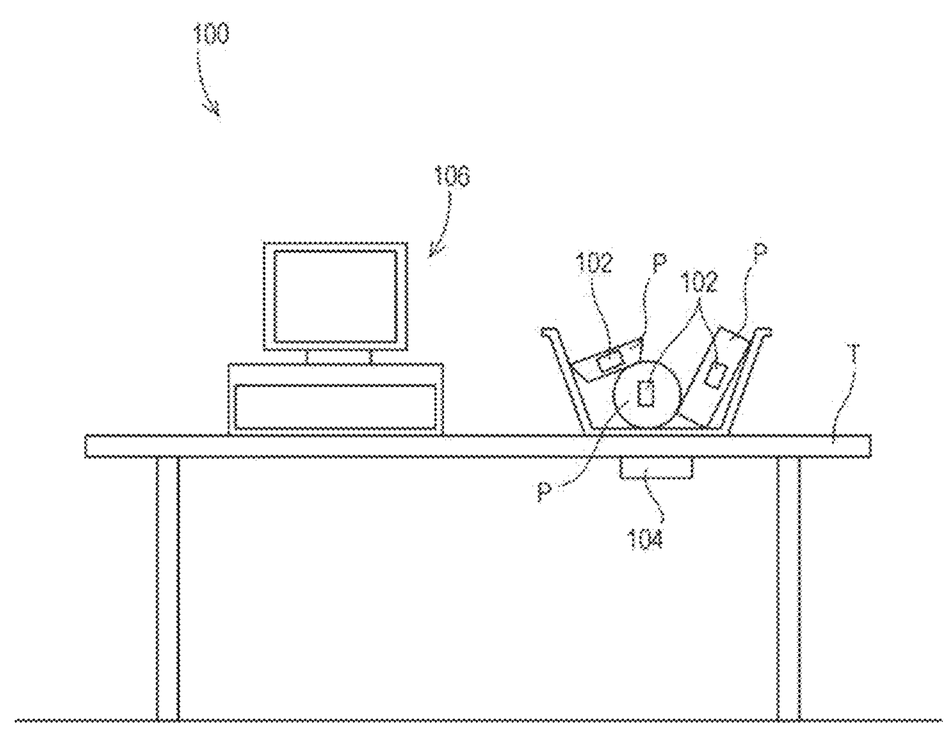
FIG. 7 schematically shows a conventional checkout system.

The horizontal plate 32 may not be placed inside the shield 44. For instance, as shown in FIG. 5, a horizontal plate 90 can be placed so as to block the opening 30 of the shield 44. In this embodiment, a mark is preferably put on the upper face of the horizontal plate 90 to indicate a place (area) on which the shopping cart B is placed. Also with this modified example, the reader 20 communicates within the communication area shown in FIGS. 3A and 3B, thus reducing the impacts of radio waves on other devices. Conveniently, the customer only needs to put the shopping basket B on the horizontal plate 90.

In the above embodiment, a rectangular enclosure is formed with the four wall plates 28 to define the shield 44 along the inner wall faces. The shape of the enclosure can be another polygon or a circle, and the shield 44 can also be polygonal or circular.

The shield can have an opening directed laterally. That is, the enclosure can have a bottom plate 26, four wall plates 28, a top plate at the upper end of each wall plate 28, and horizontal plates 32 and 50. One of the wall plate 28 can have an opening at the upper part for loading and unloading articles. In this example, preferably the radio wave reflection sheet 38 is attached to the entire lower face of the top plate, and the radio wave absorption sheet 40 is attached to the entire lower face of this radio wave reflection sheet 38.

The opening 30 of the shield 44 can be formed in at least one direction. For instance, the openings in two directions upwardly and laterally can be formed.

In the above embodiment, the reader/writer 16 and the mobile terminal 22 communicate via a network using their respective wifi modules 64 and 70. The communication interface is not limited to this, and known wireless communication interfaces such as Bluetooth (registered trademark) module can be used.

In the above embodiment, the mobile terminal 22 is used as an information providing device for providing information to the customer. The information providing device is not limited to this device, and a device operating as a higher-level device of the reader/writer 16 can be used, including a server communicable with the reader/writer 16 via a network.

The above embodiment describes clothing as an example of the product, which can be other types of products, including foodstuffs, home appliances, books, and DVDs.

The above embodiment describes products as an example, which can be other types of articles, including sample products, and cards or documents describing the contents of the service. In this embodiment, the memory 68 (storage 80) of the mobile terminal 22 (information providing terminal)

stores an article table in which the article information on the articles and their tag information are associated with each other.

Figures 6A, 6B, 6C:
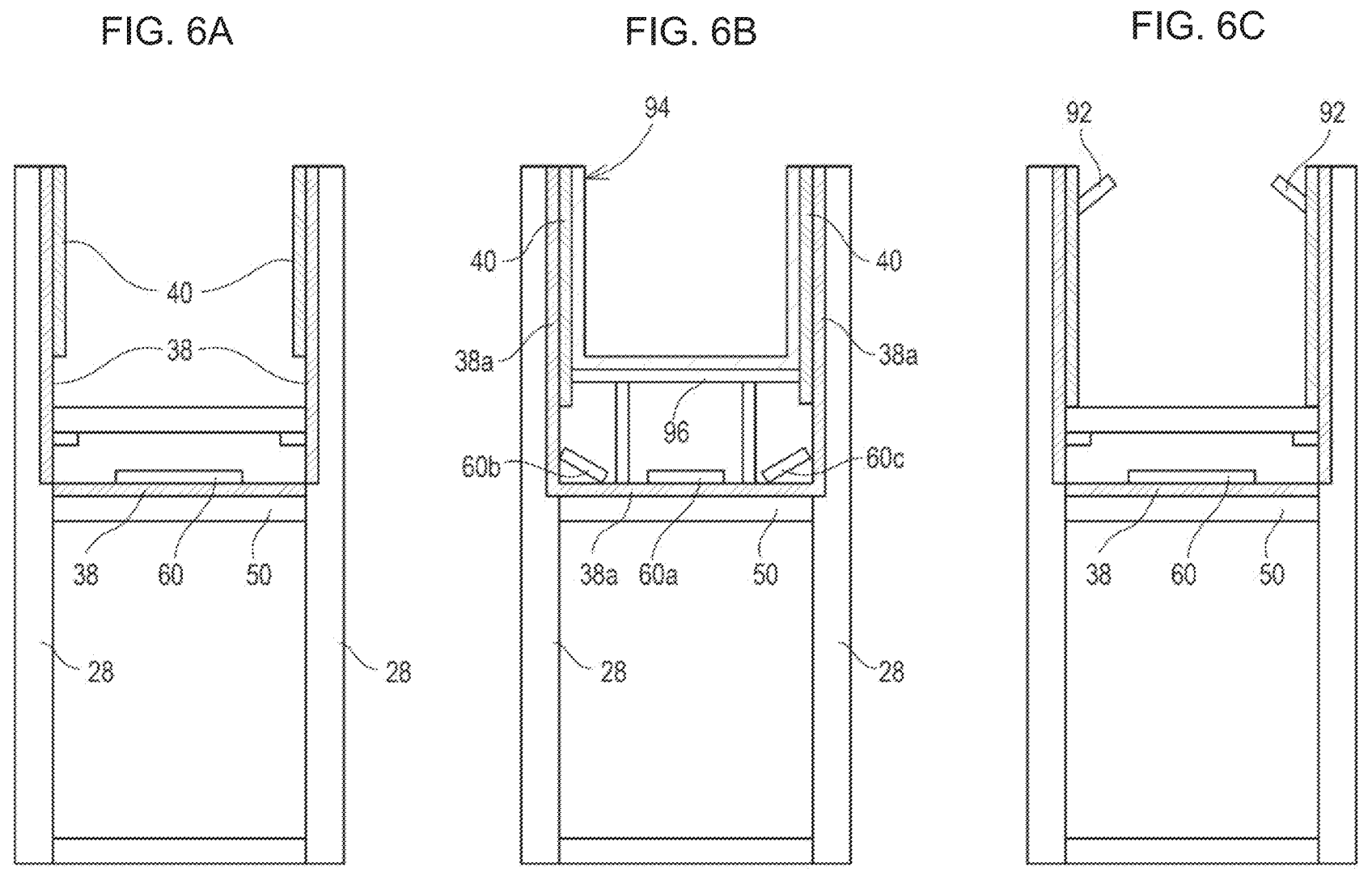

In the above embodiment, the radio wave reflection sheet 38 and the radio wave absorption sheet 40 are superposed on the inner wall surfaces 42, and the radio wave reflection sheet 38 and radio wave absorption sheet 40 of the same size extend from the upper end toward the lower end of the inner wall surfaces 42. As shown in FIG. 6A, the radio wave reflection sheet 38 can extend longer than the radio wave absorption sheet 40. In this way, the inner wall surfaces 42 have a lower part, on which only the radio wave reflection sheet 38, and not the radio wave absorption sheet 40, is disposed. This prevents attenuation of the radio waves output from the antenna immediately by the radio wave absorption sheet 40. As shown in FIG. 6A, only the radio wave reflection sheet 38 can be placed on the upper face of the horizontal plate 50.

As shown in FIG. 6B, a shield container 38*a* can be used as the radio wave reflection layer. The shield container 38*a* is a metal container, and an antenna 60*a* is disposed at the bottom. A radio wave absorption sheet 40 is attached to the inner side surfaces of the shield container 38*a* from the opening toward the bottom. A plastic container 94 is fitted inside the radio wave absorption sheet 40. This plastic container 94 is for containing products with RF tags 12 or the like, and a pedestal 96 supports the bottom of the container.

As shown in FIG. 6B, sub antennas 60*b* and 60*c* can be provided in addition to the main antenna 60*a*. The sub antennas 60*b* and 60*c*, which are auxiliaries of the main antenna 60*a*, read the RF tags 12 that the antenna 60*a* failed to read. In one example, these antennas 60*a*, 60*b*, and 60*c* are linearly polarized antennas, and the antenna 60*a* is directed in the vertical direction. The antennas 60*b* and 60*c* are disposed on both sides of the antenna 60*a* in an angled position so as to face inwardly toward each other, and emit radio waves diagonally upward. The antennas 60*a*, 60*b*, and 60*c* are not limited to the linearly polarized wave type, and can be a circularly polarized wave type. Both the linearly polarized wave type and the circularly polarized wave type can be used.

As shown in FIG. 6C, guide plates 92 can be disposed near the opening to increase the directivity of the radio waves emitted from the opening of the reader 20. The guide plates 92 are metal plates attached to the inner wall surfaces 42 so as to incline toward the opening. The guide plates 92 protruding toward the opening in this way reflect useless radio waves spreading outwardly from the opening of the reader 20 or diffract the radio waves to attenuate them at the radio wave absorption sheet 40. This makes it possible to restrict the radio waves emitted from the opening of the reader 20 to the vertical direction.

Embodiments of the present invention can be variously improved, altered, or modified based on the knowledge of those skilled in the art without departing from the spirit of the present invention. Any matters specifying the invention can be replaced with other techniques in an embodiment as long as the same action or effects are obtained from the embodiment.

What is claimed is:

1. A stationary reader that reads information from an RF tag attached to an article, comprising:

an antenna that radiates radio waves to communicate with the RF tag; and a shield that accommodates the antenna, surrounds the article, the shield having a pair of sidewalls, a plate connecting the pair of sidewalls at a first end, and an opening between the pair of sidewalls at a second end opposite the first end, the opening having a substantially same width as the plate, the opening being configured to open upward, the reader being configured to read the information from the RF tag while keeping the shield open upward.

2. The reader according to claim 1, wherein the shield includes any one or both of a radio wave absorption layer that absorbs the radio waves, and a radio wave reflection layer that reflects the radio waves.

3. An information providing system comprising:

the reader according to claim 1; and an information providing device that is communicable with the reader.

4. The information providing system according to claim 3, wherein the information providing device includes a tablet terminal or a mobile terminal.

5. A stationary reader that includes a housing, the reader reading information from an RF tag attached to an article, comprising:

an antenna that radiates radio waves to communicate with the RF tag; and a shield that is disposed in the housing and accommodates the antenna, the shield having a pair of sidewalls and an opening extending substantially an entire distance between the pair of sidewalls, while keeping each of the housing and the shield open in two directions including upward, the reader being configured to read the information from the RF tag of the article in the shield.

6. The reader according to claim 5, wherein the shield includes any one or both of a radio wave absorption layer that absorbs the radio waves, and a radio wave reflection layer that reflects the radio waves.

7. An information providing system comprising:

the reader according to claim 5; and an information providing device that is communicable with the reader.

8. The information providing system according to claim 7, wherein the information providing device includes a tablet terminal or a mobile terminal.

* * * * *